United States Patent Office 3,069,401
Patented Dec. 18, 1962

3,069,401
COPOLYMERS OF HEXAFLUOROPROPYLENE VINYLIDENE FLUORIDE AND ALIPHATIC, CHAIN TRANSFER AGENTS
George A. Gallagher, Nether Providence Township, Delaware County, Pa., assignor to E. I. du Pont de Nemours and Company, Wilmington, Del., a corporation of Delaware
No Drawing. Filed Feb. 23, 1960, Ser. No. 10,095
6 Claims. (Cl. 260—87.7)

This invention relates to new chemical compounds and more particularly to copolymers which are obtained from hexafluoropropene, vinylidene fluoride and aliphatic chain transfer agents.

This application is a continuation-in-part of my co-pending application Serial No. 822,447, filed June 24, 1959, now abandoned.

Elastomeric copolymers of hexafluoropropene and vinylidene fluoride have been described heretofore in Ind. & Eng. Chem., vol. 49, page 687 (1957), and in French Patent No. 1,161,747. The described processes for the polymerization of hexafluoropropene and vinylidine fluoride do not permit the formation of low molecular weight copolymers. In other words, the copolymers of hexafluoropropene and vinylidene fluoride which have been described are of relatively high molecular weight. Low molecular weight perfluoro compounds in the form of oils and greases are known; however, in general, these low molecular weight perfluoro compounds are not capable of being cured to form solids.

It is an object of the present invention to provide novel low molecular weight copolymers which are obtained from hexafluoropropene, vinylidene fluoride and aliphatic chain transfer agents. A further object is to provide novel low molecular weight copolymers which are viscous oils or semi-solid greases at room temperature, which melt to clear oils when heated to not more than 120° C., and which copolymers are capable of being cured to form solids. A still further object is to provide a method of preparation for these novel copolymers. Other objects will appear hereinafter.

These and other objects of this invention are accomplished by low molecular weight copolymers comprising
(a) —CH$_2$—CF$_2$— units,
(b) 

units with the weight ratio of (a) to (b) units being between about 70:30 and 45:55, said copolymers containing an average of about one radical per molecule derived from a chain transfer agent, said chain transfer agent being an aliphatic compound containing not more than 8 carbon atoms, said aliphatic compound being selected from the group consisting of alcohols, ketones and carboxylic acid esters; with the proviso that the radical derived from said transfer agent constitute not more than about 20 percent by weight of the total weight of the copolymer. The novel copolymers of the present invention are characterized by having inherent viscosities ranging from about 0.025 to 0.25 at 30° C. when dissolved in an anhydrous solvent consisting of 86.1 percent by weight of tetrahydrofuran and 13.9 percent by weight of dimethylformamide at a concentration of 0.1 percent by weight. These copolymers are further characterized as being viscous oils or semi-solid greases at room temperature which melt to clear oils when heated to not more than 120° C. These copolymers are capable of being cured to form highly useful solid materials.

The novel copolymers of this invention may be prepared by the general procedure of heating a mixture of hexafluoropropene, vinylidene fluoride and the chain transfer agent under pressure, either in the presence or absence of a solvent and in the presence of a non-metallic, organic peroxide. By using the chain transfer agent it is possible to prepare a copolymer of controlled molecular weight. If desired, the copolymer may be prepared by heating the hexafluoropropene, vinylidene fluoride and chain transfer agent in an aqueous emulsion system using a redox catalyst system such as ammonium persulfate and sodium bisulfite. In preparing these copolymers the temperatures used may range from about 100° C. to about 250° C. under autogenous pressure which is generated. The time for carrying out the procedure is variable in that it may range from about one-half hour, or less, in a continuous process to about 24 hours in a bomb.

As mentioned above, the novel copolymers of this invention are comprised of a plurality of —CH$_2$—CF$_2$— units,

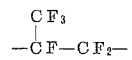

units and an average of about one radical per molecule derived from a chain transfer agent. In other words, these copolymers on the average contain units derived from hexafluoropropene, units derived from vinylidene fluoride and a radical derived from the chain transfer agent. In preparing these copolymers it is believed that the peroxide catalyst or activator initiates the polymerization of the vinylidene fluoride and hexafluoropropene molecules and that the chain transfer agent is activated by this polymerization, that a hydrogen atom from this agent becomes attached to the end of a copolymer chain and the remaining free radical activates a vinylidene fluoride or hexafluoropropene molecule so as to start another copolymer chain. In other words, this chain transfer agent functions as a chain terminating agent as well as being a chain initiating agent. The amount of chain transfer agent employed in preparing the novel copolymers of this invention will control the ultimate molecular weight of these copolymers. For the purposes of the present invention the chain transfer agent should constitute not more than about 20 percent by weight of the total weight of the copolymer.

As mentioned above, the copolymers of this invention are characterized as being viscous oils or semi-solid greases at room temperature, i.e. about 20 to 25° C., which melt to clear oils when heated to not more than 120° C. Further, these copolymers are capable of being cured to form solids. These copolymers may be further characterized as having inherent viscosities in the range of from about 0.025 to 0.25 at 30° C. when dissolved in an anhydrous solvent consisting of 86.1 percent by weight of tetrahydrofuran and 13.9 percent by weight of dimethylformamide at a concentration of 0.1 percent by weight. This is a parameter related to the molecular weight of the copolymer. The procedures for determining viscosity are well-known, as, for example, in P. J. Flory, Principles of Polymer Chemistry, Cornell University Press, Ithaca, N.Y., 1953, p. 309; L. H. Cragg, Rubber Chem. and Tech. 19, 1092 (1946).

An approximate relationship between the inherent viscosity and molecular weight of the copolymers of this invention has been established by means of analysis for characteristic end group elements of the chain transfer agent and ebullioscopic measurements on copolymers of low inherent viscosity. These approximations indicate that inherent viscosities in the region of about 0.025 correspond to molecular weights of around 1000 while an inherent viscosity of about 0.25 corresponds to molecular weights on the order of 18,000–22,000. The ratio of vinylidene fluoride units to hexafluoropropene units and the nature and molecular weight of the chain transfer agent will influence the molecular weight corresponding to the inherent viscosity of a given copolymer.

The ratio of vinylidene fluoride and hexafluoropropene units in the copolymer is a matter of importance. The ratio, by weight, of these components should range from about 70:30 to 45:55 which is equivalent to a range of molar ratios of vinylidene fluoride to hexafluoropropene units of approximately 85:15 to 65:35. Within this range, the copolymers of this invention in the upper part of the molecular weight range are curable to elastic solids and in the lower part are curable to solids which are less elastic and more plastic. As the proportion of vinylidene fluoride becomes appreciably higher than the 70:30 by weight upper limit, the copolymer, on curing, tends to lose its elastic or resilient property and becomes brittle. At the other end of the range, it becomes increasingly troublesome to introduce more hexafluoropropene units into the copolymer. Considerable excesses of hexafluoropropene must be used and recovered. The 45:55 by weight limit may be considered a practical lower limit of vinylidene fluoride content rather than an absolute lower limit.

The main function of the chain transfer agent in the preparation of the novel copolymers of this invention is to control the molecular weight by terminating the polymerization of the polymer chain and transferring the activity of said chain to one of the monomers, and thereby initiating another polymer chain. The radical which is derived from the chain transfer agent is believed to result from removal of a hydrogen atom from one of the carbon atoms of the agent.

Since the outstanding properties of these copolymers result from the inert copolymer chain of hexafluoropropene and vinylidene fluoride units, the molecular weight of the chain transfer agent is preferably held to a minimum. From a practical standpoint, an upper limit of 8 carbon atoms in the molecule of the agent has been set. Below this number, the agents are not solids, can be easily handled in the polymerization system and do not become too large a part of the copolymer. Preferably the chain transfer agent contains no more than 4 carbon atoms, and, of course, 1 carbon atom is the minimum.

It is believed that there is, on the average, one radical derived from the chain transfer agent per copolymer molecule. In order that the copolymers of this invention possess desirable properties, the proportion of the chain transfer agent which is present should not constitute more than about 20 percent by weight of the total weight of the copolymer. The chain transfer agents which are useful in the present invention are saturated aliphatic compounds containing not more than about 8 carbon atoms. These chain transfer agents may be straight or branch chain aliphatic alcohols, ketones or carboxylic acid esters. Typical alcohols are methanol, ethanol, isopropanol, 2-ethylhexanol-1. Typical ketones are acetone, methylethyl ketone, methylpropyl ketone, etc. Typical carboxylic acid esters are ethyl acetate, ethyl caproate (ethyl hexanoate), butyl formate, amyl acetate, etc.

As mentioned above the copolymers of this invention are prepared in the presence of a non-metallic organic peroxide. These peroxides function as promoters or initiators in that they initiate free radicals. Useful organic peroxides include acyl peroxide such as acetyl peroxides, chloroacetyl peroxides, benzoyl peroxide, dicumyl peroxide cumene hydroperoxide and di-tertiary butyl peroxide.

The copolymers of this invention represent the first copolymers of vinylidene fluoride and hexafluoropropene of controlled, low molecular weight and which are capable of being cured to highly useful solids. They are useful as plasticizers for fluorocarbon elastomers. They have the advantage of being cured by the elastomer curing agents, such as hexamethylene diamine carbamate, so that they become integral parts of the cured elastomer and cannot migrate. They can be compounded with filling agents and curing agents and used as plastic caulking compositions where the solid fluoroelastomers cannot be used because of the difficulty in positioning the elastomer. These copolymers may be compounded with curing agents and used as pourable, curable compositions for forming complex castings for which the conventional solid fluoroelastomer compositions are not suitable.

The following examples will be better illustrate the nature of the present invention; however, the invention is not intended to be limited to these examples. Parts are by weight unless otherwise indicated.

As illustrated in Examples 1 to 8, the copolymers may be prepared in a conventional stainless steel or silver-lined cylindrical bomb of 400 ml. volume. The procedure was to put the solid and liquid materials in the bomb, then close it with a cap bearing inlet and vent lines, cool the bomb to about −60 to −70° C. in a solid carbon dioxide-acetone bath and evacuate. The gaseous reactants were then weighed in and the bomb was closed. The closed bomb was then placed in a heated shaker and heated to the specified temperature for the specified time while it was shaken. The bomb was then removed, cooled, vented and discharged. The copolymers were analyzed for vinylidene fluoride by an infrared absorption analysis and by a nuclear magnetic resonance technique to determine vinylidene fluoride-chain transfer agent mole ratio. From these measurements and the molecular weights of the various components, the weight percent composition was calculated.

The polymerization may also be conducted in a continuous manner. A conventional pressure vessel may be utilized as a reactor and the gaseous monomers and liquid reactants may be pumped into the reaction vessel. The copolymer solution and any unreacted monomers are then removed through a line from the vessel to a pressure let-down valve. All such equipment is conventional in the chemical processing field. The reaction vessel is operated liquid full. The peroxide initiators are conveniently introduced in solution in the aliphatic chain transfer agent.

Any unreacted monomers in the discharged polymerization mass are conveniently removed by venting them from the vessel in which the copolymer emulsion is collected immediately following the pressure let-down valve. The monomers are then compressed to the pressure necessary to feed them to the reaction vessel and are then mixed with fresh monomers to maintain a steady rate of feed to the polymerization mass. If desired, a continuous infrared analyzer may be incorporated in the line to monitor the feed composition. This is usually unnecessary since a steady state is readily attained. By means of the recycle feature, the yield of copolymer based on the monomers fed to the polymerization vessel is increased to the order of 95% or better.

Continuous processes of this type are illustrated in Examples 9 and 10. However, modifications and alterations of these illustrative examples within the scope of the invention may be made.

The inherent viscosity was determined in an anhydrous solvent consisting of 86.1 percent tetrahydrofuran and 13.9 percent dimethylformamide. For convenience this solvent will be referred to as the THF/DMF solvent.

*Example 1*

A mixture of 4.5 ml. of ethyl acetate, 1.0 ml. of di-t- butylperoxide, 90 g. of hexafluoropropene and 90 g. of vinylidene fluoride was heated to 130° C. in a 400 ml. stainless steel bomb for sixteen hours. The resulting copolymer was dissolved in acetone and the solution was drum dried on a drum at 5 lbs. steam pressure yielding 142 g. of a tacky semisolid having an inherent viscosity in THF/DMF at 30° of 0.109 which corresponds to a molecular weight of about 8,400. The vinylidene fluoride content of the copolymer is 56.4 percent by weight, the hexafluoropropene content is 42.5 percent by weight and the ethyl acetate content is 1.1 percent by weight.

Example 2

A mixture of 335 ml. of ethyl acetate, 8.5 ml. of di-t-butylperoxide, 315 g. of hexafluoropropene and 315 g. of vinylidene fluoride was heated in a 1350 ml. stainless steel bomb to 130° C. The temperature rose rapidly to 250° C. at which point the reaction was complete. The resulting solution was drum dried at 5 p.s.i.g. steam pressure to yield 450 g. of a tacky grease with an inherent viscosity in THF/DMF of 0.059 which corresponds to a molecular weight of about 2,800. The vinylidene fluoride content of the copolymer is 66.9 percent by weight, the hexafluoropropene content is 30.2 percent by weight and the ethyl acetate content is 3.2 percent by weight.

Example 3

100 grams of methanol, 3 ml. of di-t-butylperoxide, 60 g. of hexafluoropropene and 60 g. of vinylidene fluoride were heated in a 1400 ml. of stainless steel bomb at 150° C. for 1 hour. After discharging and evaporating the methanol there was obtained 8 g. of a very viscous oil having an inherent viscosity in the THF/DMF solvent of 0.06 which corresponds to a molecular weight of about 2,850. The vinylidene fluoride content is 62.3 percent by weight, the hexafluoropropene content is 36.6 percent by weight and the methanol content is 1.1 percent by weight.

Example 4

100 ml. of ethyl acetate, 3 g. of cumene hydroperoxide, 60 g. of hexafluoropropene and 60 g. of vinylidene fluoride were heated in a 1400 ml. stainless steel bomb at 150° C. for 1 hour. The ethyl acetate was evaporated and a viscous oily product was obtained. The product had an inherent viscosity of 0.03 in the THF/DMF at 30° C., which corresponds to a molecular weight of about 1,200. The vinylidene fluoride content is 61.1 percent by weight, the hexafluoropropene content is 31.5 percent by weight and the ethyl acetate content is 7.5 percent by weight.

Example 5

A mixture of 60 ml. of ethyl acetate, 5 g. of dicumyl peroxide, 60 g. of hexafluoropropene and 60 g. of vinylidene fluride was heated at 140° C. in a 400 ml. stainless steel bomb for 8 hours. The solvent was evaporated and 48 g. of a tacky grease was obtained. The product had an inherent viscosity of 0.05 in the THF/DMF solvent at 30° C., which corresponds to a molecular weight of about 2,300. The vinylidene fluoride content is 59.6 percent by weight, the hexafluoropropene content is 36.5 percent by weight and the ethyl acetate content is 3.9 percent by weight.

Example 6

A mixture of 60 g. of hexafluoropropene, 60 g. of vinylidene fluoride, 1 ml. of di-t-butylperoxide and 10 g. of ethyl caproate was charged into a 400 ml. stainless steel bomb by the standard procedure and heated at 130° C. for 8 hours. The product was heated under vacuum at 100° C. for 1 hour to remove volatile materials. It was a viscous liquid having an inherent viscosity in the THF/DMF mixture of 0.08 which corresponds to a molecular weight of about 4,150. The fluoride content is 65.6 percent by weight, the hexafluoropropene content is 30.9 percent by weight and the ethyl caproate content is 3.5 percent by weight.

Example 7

A mixture of 60 g. of hexafluoropropene, 60 g. of vinylidene fluoride, 2 ml. of di-t-butylperoxide and 5 g. of octanol-2 was charged into a 400 ml. stainless steel bomb by the standard procedure and heated at 130° C. for 8 hours. The bomb was discharged and the product heated for an hour at 100° C. under vacuum to remove volatile products. The resultant viscous liquid had an inherent viscosity in the THF/DMF mixture of 0.07 which corresponds to a molecular weight of about 3,450. The vinylidene fluoride content is 59.7 percent by weight, the hexafluoropropene content is 36.5 percent by weight and the octanol-2 content is 3.8 percent by weight.

Example 8

A mixture of 80 g. of hexafluoropropene, 40 g. of vinylidene fluoride, 3 ml. of di-t-butylperoxide and 2.5 g. of methyl ethyl ketone was charged into a 400 ml. stainless steel bomb in the usual way and heated at 130° C. for 8 hours. The bomb was cooled, vented and discharged and the product was heated for an hour at 100° C. under vacuum. The resultant tacky grease had an inherent viscosity of 0.13 in the THF/DMF mixture which corresponds to a molecular weight of about 7,550. The vinylident fluoride content is 46.6 percent by weight, the hexafluoropropene content is 52.5 percent by weight and the ketone content is 0.9 percent by weight.

Example 9

(A) Into an autoclave of 1430 ml. free volume agitated at 545 r.p.m. was pumped at the rate of 1.8 liters per hour a catalyst solution consisting of 980 ml. of ethyl acetate and 20 ml. of di-t-butylperoxide. Vinylidene fluoride was added at the rate of 1.5 lb. per hour and hexafluoropropene at the rate of 1 lb. per hour. The pressure was 900 lbs. per sq. in. The polymer solution was removed continuously through a pressure let-down valve. The temperature of the autoclave was maintained at 125 to 130° C. for the first hour and the product was collected. During the second hour the temperature was held in the range of 130–137° C. and the product was collected separately. The third hour, the temperature was held at 137–139° C. and the product collected. The three polymer solutions thus obtained were dum dried at a steam pressure of 20 lbs. per sq. in. gauge to yield tacky greases. The data for the three runs are as follows:

| Hour | Temp., °C. | Wt. Dried Product | Brookfield Viscosity, 90° C. |
|---|---|---|---|
| 1 | 125–130 | 312 | 15,000 |
| 2 | 130–137 | 468 | 4,000 |
| 3 | 137–139 | 569 | 1,000 |

It is obvious that the molecular weight of the grease decreases with increasing temperature.

(B) A composition of material produced at the several temperatures in A above had an inherent viscosity in THF/DMF of 0.089 which corresponds to a molecular weight of about 4,700. The vinylidene fluoride content is 63.9 percent by weight, the hexafluoropropene content is 34.3 percent by weight and the ethyl acetate content is 1.9 percent by weight.

The grease was heated in an oven at 204° C. for 24 hours to remove any volatile material and then 20 parts was milled into 100 parts of a copolymer of 60 parts vinylidene fluoride and 40 parts of hexafluoropropene. The Mooney viscosity of the mixture at 100° C. was 27 after 10 minutes compared to 60 for the unplasticized vinylidene fluoride-hexafluoropropene copolymer. The vulcanizate properties of the cured plasticized elastomer were the same as those of the cured control containing no plasticizer as shown in the following table. (The control and plasticized elastomer were both cured, after the addition of curing agents, in a press for 1 hour at 150° C., followed by oven cures of 1 hour at 100° C. 1 hour at 140° C. and 24 hours at 203° C.)

|  | Control | Plasticized Copolymer |
|---|---|---|
| Vinylidene fluoride/hexafluoropropene copolymer | 100 | 100 |
| Composite of Part B of this Example |  | 20 |
| Magnesium Oxide | 15 | 15 |
| Medium Thermal Black | 18 | 18 |
| Hexamethylenediamine carbamate | 1.0 | 1.5 |
| Modulus at 200% elongation, lbs./sq. in | 1,210 | 1,340 |
| Tensile strength at break, lbs./sq. in | 2,100 | 2,150 |
| Elongation at break, percent | 290 | 290 |

*Example 10*

The apparatus used in Example 9 was modified as follows. The product receiver was connected to a gas compressor so that unreacted gaseous monomers could be recycled to the reactor. A vent was also incorporated so that the gases could be discarded when they were not being recycled.

A catalyst solution consisting of 45 ml. of di-t-butylperoxide in one l. of ethyl acetate was pumped into the reactor at the rate of 1.13 l./hr. Vinylidene fluoride and hexafluoropropylene were fed to the reactor at the rate of 2.82 and 1.88 lbs./hr. respectively. The reactor was maintained at a temperature of 140–145° C. and 900 p.s.i.g. During the first 2½ hrs. of reaction the unreacted monomers were vented and an 83½% conversion was obtained as judged by the measurement of off-gas rate. The ethyl acetate solution of the polymer was drained continuously from the product receiver, and each hour's production was bottled separately.

The unreacted monomers were then recycled, and the fresh monomer feed rates were cut to 83½% of their initial values to maintain the same total monomer feed rate to the reactor. The reaction was continued under these conditions for another 2 hours with product being drained continuously and collected in separate hourly lots.

Representative samples of each operating condition were analyzed. Sample No. 1 which represented operation with no recycle was collected over 70 min., weighed 3315 g., and contained 53.1% solids as measured by evaporating the ethyl acetate. This represents a conversion of 70.5%. The monomer weight ratio in the copolymer as measured by infrared analysis was 68 percent vinylidene fluoride and 32 percent hexafluoropropene. The copolymer has a molecular weight of about 2820. Sample No. 2, which represents operation with recycle, was collected over 60 min., weighed 2800 g. and contained 61.0% solids. This represents a conversion based on fresh monomer feed of 96%. The monomer weight ratio in the polymer was 61 percent vinylidene fluoride and 39 percent hexafluoropropene. The copolymer has a molecular weight of about 2820.

As many widely different embodiments of this invention may be made without departing from the spirit and scope thereof, it is to be understood that this invention is not limited to the specific embodiments thereof except as defined in the appended claims.

What is claimed is:

1. Copolymers comprising (a) —CH$_2$—CF$_2$— units,
(b) 
units with the weight ratio of (a) to (b) units being between about 70:30 and 45:55, each of the copolymer molecules being terminated, on a average, by the elements of one molecule of a chain transfer agent, said chain transfer agent being a halogen-free, saturated acyclic compound containing up to 8 carbon atoms, said acyclic compound being selected from the group consisting of alcohols, ketones and carboxylic acid esters; with the proviso that the radicals derived from said transfer agent constitute up to about 20 percent by weight of the total weight of said copolymer; said copolymers being characterized by having inherent viscosities ranging from about 0.025 to 0.25 at 30° C. when dissolved in an anhydrous solvent consisting of 86.1 percent by weight of tetrahydrofuran and 13.9 percent by weight of dimethylformamide at a concentration of 0.1 percent by weight.

2. Copolymers according to claim 1 wherein the chain transfer agent is ethyl acetate.

3. The process for preparing a copolymer having an inherent viscosity ranging from about 0.025 to 0.25 at 30° C. when dissolved in an anhydrous solvent consisting of 86.1 percent by weight of tetrahydrofuran and 13.9 percent by weight of dimethylformamide at a concentration of 0.1 percent by weight, which comprises heating, at a temperature of from about 100° C. to about 250° C. under autogenous pressure, a mixture of (a) vinylidene fluoride, (b) hexafluoropropene and (c) a chain transfer agent in contact with a non-metallic organic peroxide, said chain transfer agent being a halogen-free, saturated acyclic compound containing up to 8 carbon atoms, said acyclic compound being selected from the group consisting of alcohols, ketones and carboxylic acid esters.

4. A process according to claim 3 wherein the chain transfer agent is ethyl acetate.

5. A process according to claim 4 wherein the organic peroxide is di-t-butylperoxide.

6. A process according to claim 3 carried out in a continuous manner wherein the vinylidene fluoride, hexafluoropropene, chain transfer agent and non-metallic organic peroxide are continuously introduced into the reaction vessel and the polymerization mass is continuously removed and the copolymer recovered therefrom.

References Cited in the file of this patent

UNITED STATES PATENTS

| 2,419,010 | Coffman et al. | Apr. 15, 1947 |
| 2,856,440 | Wolff | Oct. 14, 1958 |
| 2,933,481 | Rugg | Apr. 19, 1960 |
| 2,952,669 | Bro | Sept. 13, 1960 |

OTHER REFERENCES

Dixon et al.: Ind. & Eng. Chem., October 1957, vol. 49, No. 10, pages 1687–1690.